US012576922B2

(12) United States Patent
Soonthornwinate et al.

(10) Patent No.: US 12,576,922 B2
(45) Date of Patent: Mar. 17, 2026

(54) TAILGATE CABLE STAY RAMP

(71) Applicant: Toyota Motor Engineering & Manufacturing North America, Inc., Plano, TX (US)

(72) Inventors: Tarakorn Soonthornwinate, Plymouth, MI (US); Jayaprabhu KA Ramaswamy, Ann Arbor, MI (US); James D. Cunningham, Clarkston, MI (US); Eric Archambeau, Northville, MI (US); Yasuhisa Tsuchida, Northville, MI (US); Stefan Hebert, Northville, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 446 days.

(21) Appl. No.: 18/139,843

(22) Filed: Apr. 26, 2023

(65) Prior Publication Data

US 2024/0359749 A1 Oct. 31, 2024

(51) Int. Cl.
B62D 33/027 (2006.01)
B62D 33/03 (2006.01)
B62D 63/04 (2006.01)

(52) U.S. Cl.
CPC ......... B62D 33/0273 (2013.01); B62D 33/03 (2013.01); B62D 63/04 (2013.01)

(58) Field of Classification Search
CPC .... B62D 33/0273; B62D 33/03; B62D 63/04; E05Y 2900/544; E05F 15/40; E05F 15/41

USPC ......................................... 296/57.1, 58, 1.07
See application file for complete search history.

(56) References Cited

U.S. PATENT DOCUMENTS

| | | | |
|---|---|---|---|
| 5,156,432 A | 10/1992 | McCleary | |
| 6,068,321 A | 5/2000 | Ooms | |
| 7,357,435 B2 | 4/2008 | Robertson | |
| 7,484,784 B2 * | 2/2009 | Ohly ................. B62D 33/0273 296/57.1 |
| 7,631,922 B2 | 12/2009 | Armstrong et al. | |

(Continued)

FOREIGN PATENT DOCUMENTS

| | | | |
|---|---|---|---|
| CN | 109094665 A | 12/2018 | |
| GB | 2553318 A | 3/2018 | |
| WO | WO-2015030044 A1 * | 3/2015 ............ E05F 15/632 |

OTHER PUBLICATIONS

Nishikibe et al. (WO 2015030044 A1), machine translation (Year: 2015).*

Primary Examiner — Amy R Weisberg
Assistant Examiner — Wenwei Zhuo
(74) Attorney, Agent, or Firm — Snell & Wilmer LLP

(57) ABSTRACT

A vehicle includes a tailgate configured to enclose a truck bed, a power tailgate system configured to cause the tailgate to move between a closed position and an open position, at least one sensor disposed on the tailgate, a cable stay configured to couple to the tailgate and a body of the vehicle such that the cable stay is extended between the tailgate and the body of the vehicle when the tailgate is in the open position, and a cable stay ramp assembly disposed on the body of the vehicle and configured to guide the cable stay as the tailgate moves from the open position to the closed position. The sensor is configured to detect an object between the tailgate the body of the vehicle.

18 Claims, 5 Drawing Sheets

(56)     References Cited

U.S. PATENT DOCUMENTS

| | | | |
|---|---|---|---|
| 8,141,929 B2 | 3/2012 | Marshall | |
| 8,764,090 B2 | 7/2014 | Kerr | |
| 9,636,978 B2 | 5/2017 | Warburton et al. | |
| 10,081,303 B1 | 9/2018 | Ngo et al. | |
| 10,286,873 B1 | 5/2019 | Krush et al. | |
| 10,343,728 B2 | 7/2019 | Jergess et al. | |
| 10,941,602 B2 | 3/2021 | Ghannam et al. | |
| 2011/0121602 A1* | 5/2011 | Zielinsky | E05C 17/36 |
| | | | 296/57.1 |
| 2016/0160553 A1 | 6/2016 | Nania | |
| 2018/0147976 A1* | 5/2018 | Stojkovic | B62D 33/03 |
| 2022/0056750 A1* | 2/2022 | Reif | B62D 33/0273 |
| 2023/0339550 A1* | 10/2023 | Reif | B62D 33/03 |
| 2025/0043617 A1* | 2/2025 | Rahman | E05F 15/63 |

* cited by examiner

TAILGATE CABLE STAY RAMP

BACKGROUND

1. Field

The various aspects and embodiments described herein relate generally to vehicle tailgates and, in particular, to a power tailgate with a cable stay ramp.

2. Description of the Related Art

A power tailgate (PTG) system can open and close a tailgate automatically using a remote or a switch. In addition, in order to prevent injury when the tailgate opens or closes, the tailgate (e.g., via a sensor and/or a tailgate motor sensing a spike in current) is configured to detect a part of a body or any other object that obstructs the PTG operation or system and if so, sends a signal to the PTG ECU to stop the opening or closing operation. However, there is an area that a tailgate cable stay can rest on the touch sensor when the tailgate is in the closed position, resulting in degradation of the touch sensor activation (e.g., activation force is too high). Thus, there is a need for a tailgate cable stay ramp.

SUMMARY

In general, one aspect of the subject matter described in this disclosure may be embodied in a vehicle. The vehicle includes a tailgate configured to enclose a truck bed, a power tailgate system configured to cause the tailgate to move between a closed position and an open position, at least one sensor disposed on the tailgate, a cable stay configured to couple to the tailgate and a body of the vehicle such that the cable stay is extended between the tailgate and the body of the vehicle when the tailgate is in the open position, and a cable stay ramp assembly disposed on the body of the vehicle and configured to guide the cable stay as the tailgate moves from the open position to the closed position. The sensor is configured to detect an object between the tailgate and the body of the vehicle.

In another aspect, the subject matter may be embodied in a cable stay ramp assembly of a vehicle. The cable stay ramp assembly includes a ramp disposed on a body of the vehicle and configured to guide a cable stay of a tailgate as the tailgate moves from an open position to a closed position.

In another aspect, the subject matter may be embodied in a method of using a cable stay ramp assembly. The method includes transitioning a tailgate of a vehicle from an open position to a closed position, providing a cable stay ramp assembly coupled to a vehicle side panel of the vehicle, and guiding a cable stay, via a ramp of the cable stay ramp assembly, such that the cable stay is aligned inward and avoids contact with at least one sensor disposed on the tailgate.

BRIEF DESCRIPTION OF THE DRAWINGS

Other apparatuses, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The apparatus and methods described herein prevent damage to a tailgate sensor in a power tailgate system (PTG). For instance, a tailgate stay ramp assembly may include a ramp shaped structure disposed on a deck side of a tailgate to guide a tailgate cable stay away from the tailgate sensor, thus preventing damage to the tailgate sensor and degradation of the tailgate sensor activation. By spacing or otherwise positioning the cable stay away from the tailgate sensor, direct contact between the two components is avoided which ensures the tailgate sensor activation force requirement.

Figure 1:
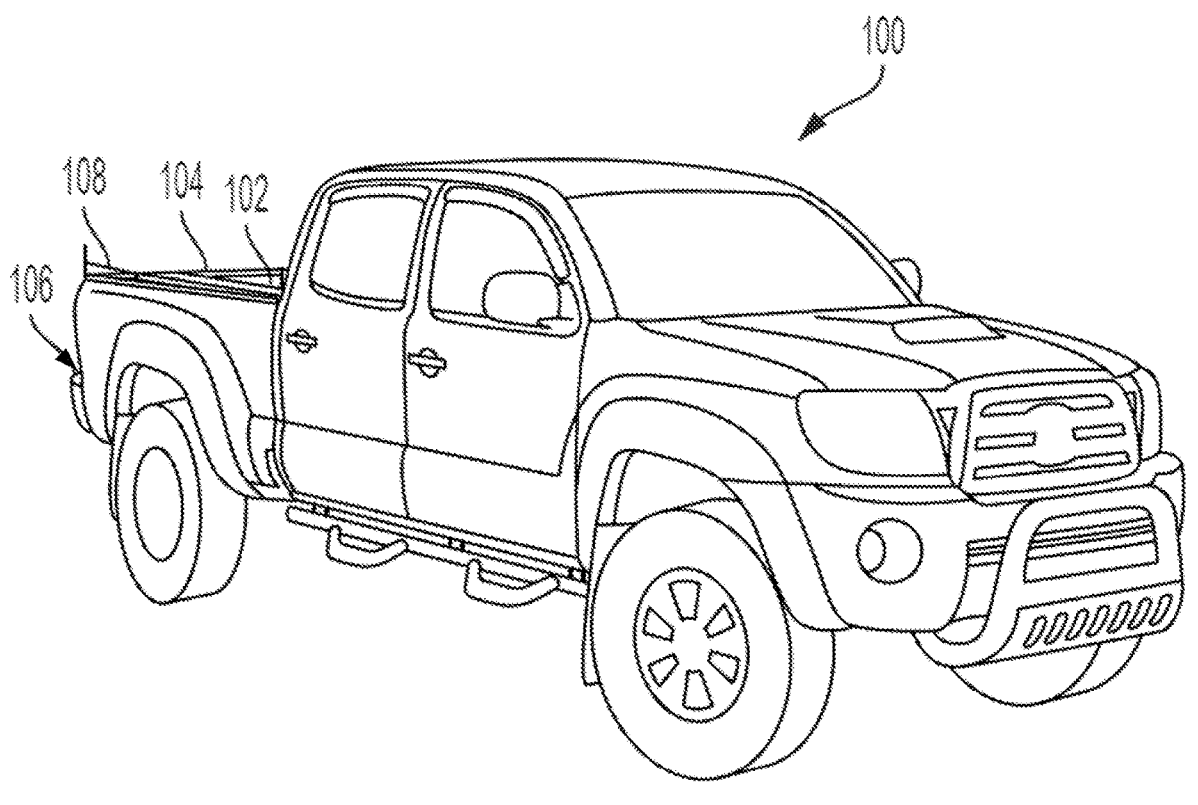
FIG. 1 illustrates a perspective view of a vehicle according to an aspect of the present disclosure.

FIG. 1 illustrates a perspective view of a vehicle 100 to be used with a power tailgate system and a tailgate ramp assembly, according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a pick-up truck, an SUV, a UTV, a minivan, a stain wagon, or another other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1 depicts a pick-up truck by example. The vehicle 100 may be an autonomous or semi-autonomous vehicle having self-driving capabilities. The vehicle 100 may have a truck bed 102 enclosed by a tailgate 104 from a rear end 106. The truck bed 102 may have an open top or a closed top. The truck bed 102 may be suitable to store and transport cargo. The truck bed 102 may accommodate cargo that has a length longer than a length 108 of the truck bed 102. For instance, the cargo may extend out from the tailgate 104. In some embodiments, the tailgate 104 may enclose a trunk. The tailgate 104 may be manufactured from metal, glass, plastic, and/or wood.

Figure 2A:
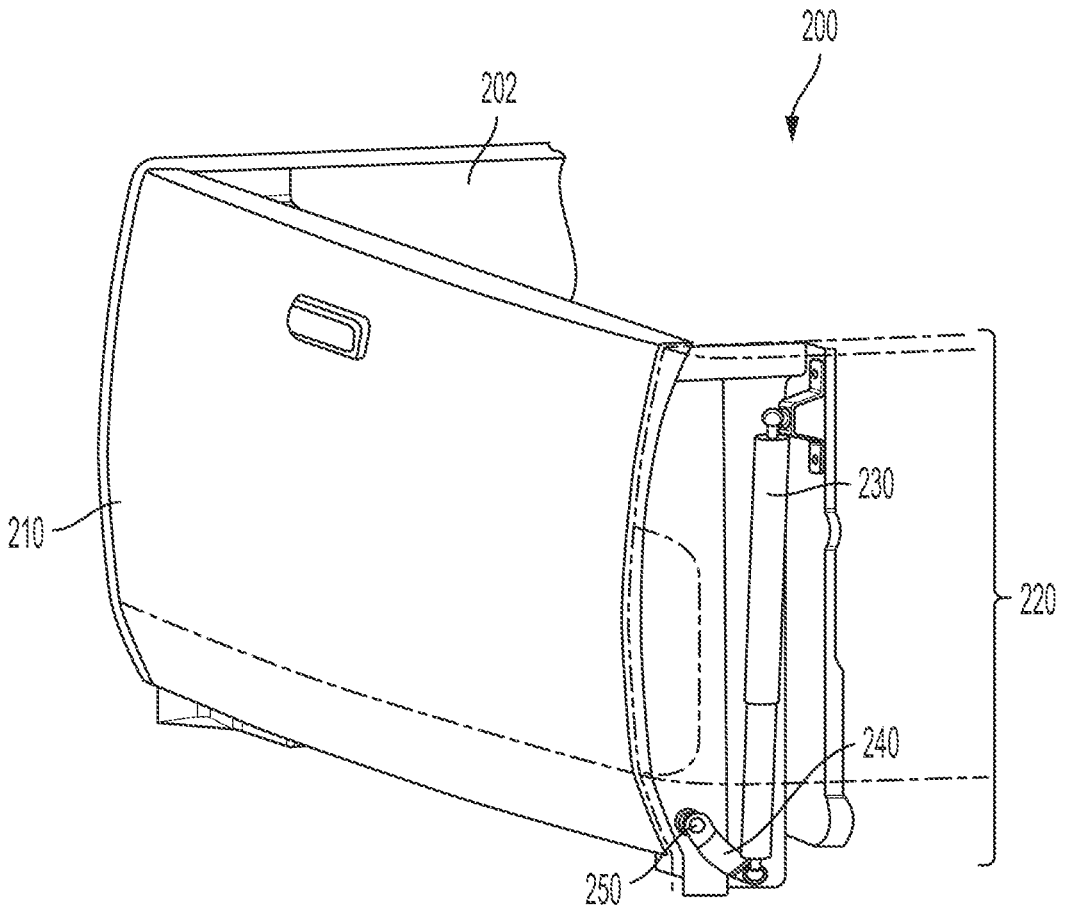
FIG. 2A illustrates a tailgate in a closed position according to an aspect of the present disclosure.
Figure 2B:
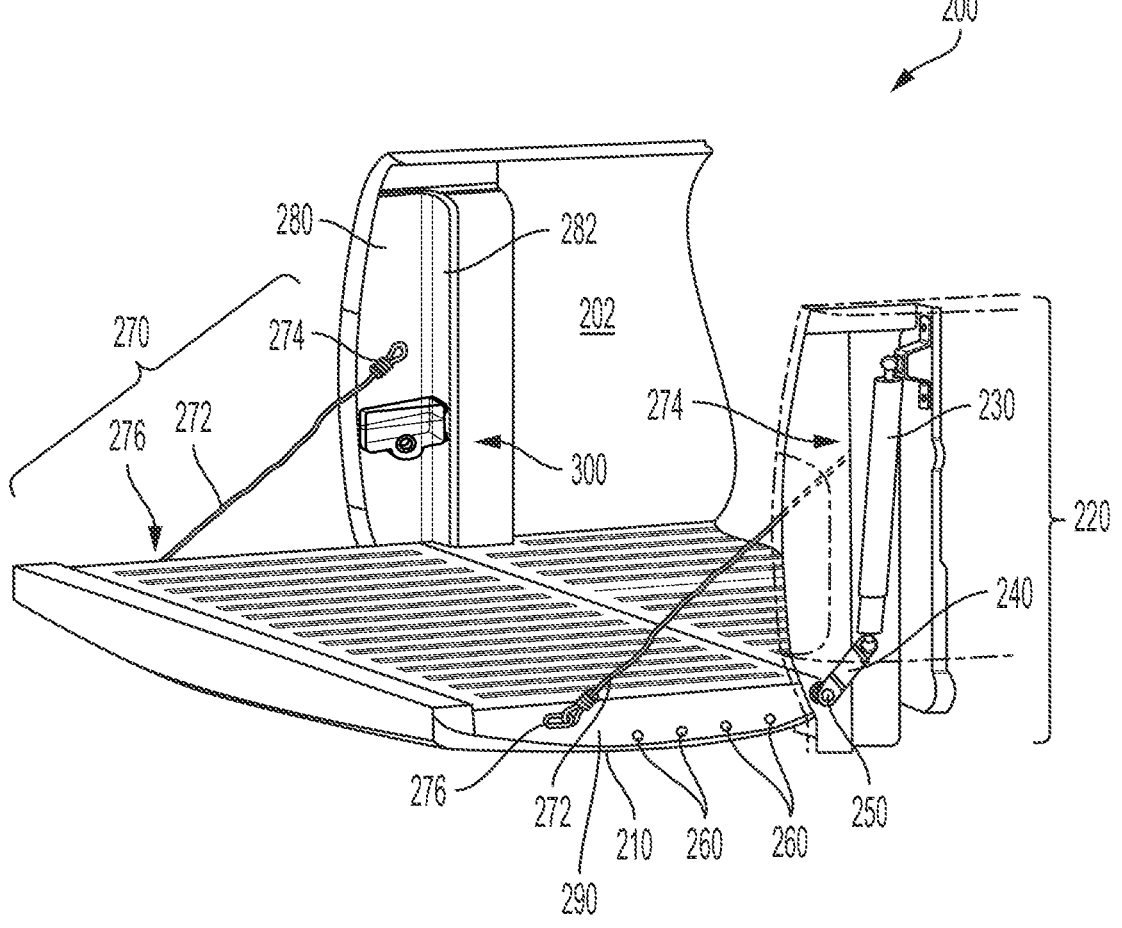
FIG. 2B illustrates the tailgate of FIG. 2A in an open position according to an aspect of the present disclosure.

FIGS. 2A and 2B show isolated views of a power tailgate assembly 200, to be used with the vehicle 100, in a closed position (FIG. 2A) and an open position (FIG. 2B), according to an aspect of the present disclosure. The power tailgate assembly 200 includes a tailgate 210 (e.g., similar to the tailgate 104) and a motor assembly 220 that is connected to the tailgate 210 and configured to cause the tailgate 210 to move between the closed position and the open position and vice versa. In one or more embodiments, the tailgate 210 is attached to the vehicle 100 on a pivotal connection, e.g., a hinge mechanism 250, which permits rotary motion of the tailgate 210 between the closed position and the open position and vice versa.

In one or more embodiments, the motor assembly 220 may include a spindle drive 230 connected to a hinge arm 240, which is in turn connected to the hinge mechanism 250. The spindle drive 230 is shown in an extended disposition when the tailgate 210 is in the closed position as shown in FIG. 2A and a contracted disposition when the tailgate 210 is in the open position as shown in FIG. 2B. The spindle drive 230 is constructed to functionally extend and contract to move the hinge arm 240 which in turn causes the tailgate 210 to pivot on the hinge mechanism 250 between the closed position and the open position. As an example, when the spindle drive 230 contracts, the hinge arm 240 moves upward causing the tailgate 210 to rotate about the hinge mechanism 250 to open the tailgate 210. When the spindle drive 230 extends, the hinge arm 240 moves downward causing the tailgate 210 to rotate about the hinge mechanism 250 to close the tailgate 210.

Referring to FIG. 2B, the power tailgate assembly 200 may include one or more sensor 260. As shown, the sensors 260 may be positioned on a left side and/or right side panel or portion of the tailgate 210. In various embodiments, at least one sensor 260 may be a tailgate touch sensor. For instance, the tailgate touch sensor 260 may be configured to detect when the tailgate 210 is closed and/or if an object is sandwiched between a vehicle body 202 and the tailgate 210. That is, when an object is sandwiched between the vehicle body 202 and the tailgate 210 and the object is in contact with or very close to the tailgate touch sensor 260, a sensing portion of the tailgate touch sensor 260 may be activated or depressed by the reaction force from the sandwiched object, thereby detecting the object.

After the object is detected by one or more tailgate touch sensors 260, the tailgate 210 stops closing and reverses direction to perform a gate opening. In other words, when the tailgate touch sensor 260 is activated or depressed, or the object is otherwise detected, a detection signal from the tailgate touch sensor 260 is output to a power tailgate electronic control unit (ECU) (not shown) or a controller within the spindle drive 230. Then, the power tailgate ECU outputs a door opening command signal to an actuator (e.g., the motor assembly 220) to stop the closing operation of the tailgate 210 and to execute a door opening operation. The door opening operation may be an operation of opening the tailgate 210 to the fully open position, or an operation of opening the tailgate 210 to a predetermined (or a partially open) position (to the extent of releasing the pinching of the object).

The vehicle 100 may further comprise a cable stay 270. The cable stay 270 may be configured to further secure the tailgate 210 to the vehicle body 202. For instance, the cable stay 270 may be configured to level the tailgate 210 and/or ensure stability of the tailgate 210 when weight is applied (e.g., in the open position). The cable stay 270 may include a cable 272, a first fastener 274, and a second fastener 276. The cable 272 may extend between the first (e.g., vehicle) fastener 274 and the second (e.g., tailgate) fastener 276. The first fastener 274 may be configured to couple (e.g., attach, secure, mount, etc.) the cable 272 to the vehicle body 202. The second fastener 276 may be configured to couple the cable 272 to the tailgate 210. The cable 272 may be a flexible cable such that the cable stay 270 is configured to fold over itself when the tailgate 210 is transitioned from the open position to the closed position.

Figure 3A:
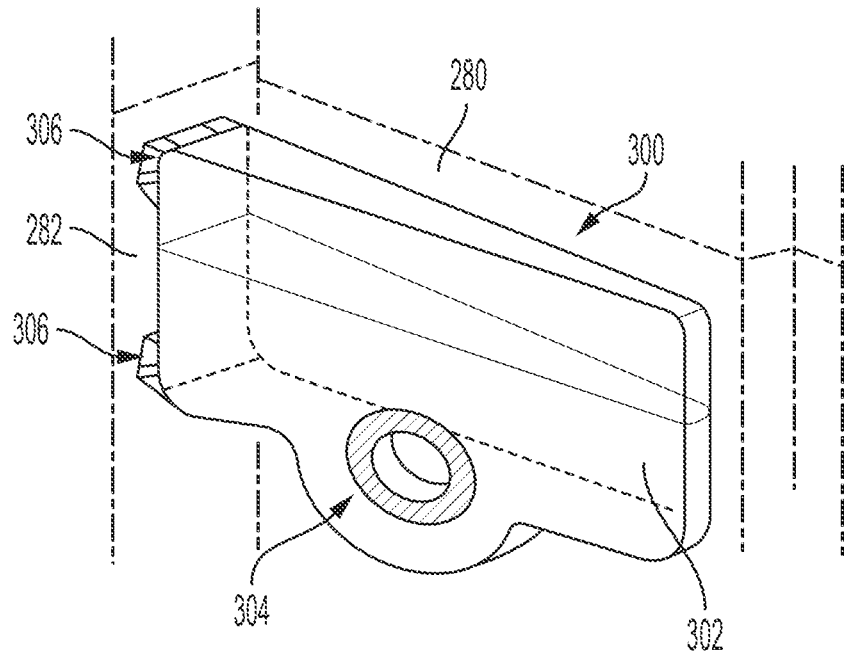
FIGS. 3A and 3B illustrate a detailed view of a cable stay ramp assembly according to an aspect of the present disclosure.
Figure 3B:
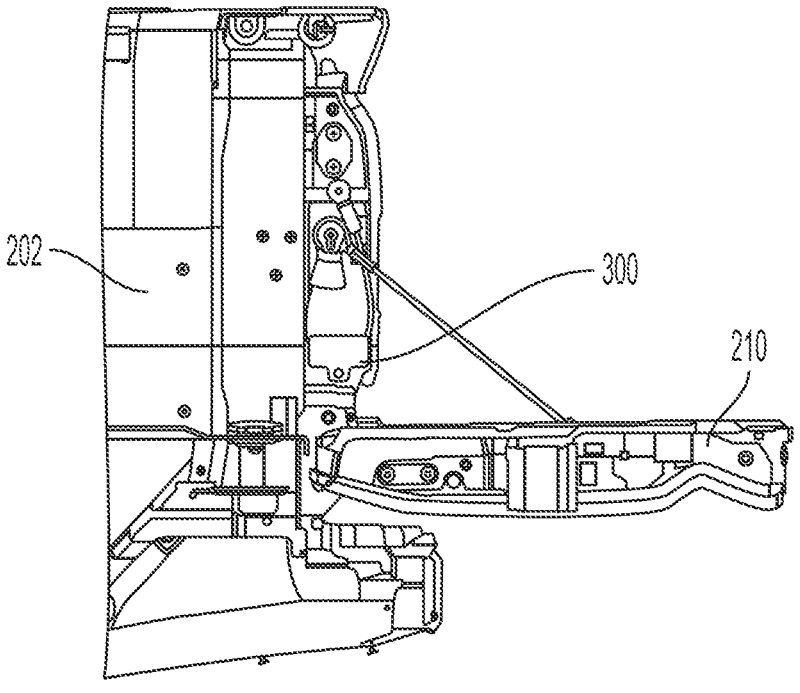

Referring to FIGS. 2B, 3A, and 3B, the vehicle 100 further comprises a cable stay ramp assembly 300. As shown in FIG. 2B, the cable stay ramp assembly 300 may be formed in the shape of a wedge or a triangle. The cable stay ramp assembly 300 may be configured to prevent the cable stay 270 from moving outward toward the one or more sensors 260 when the tailgate 210 is moved from the open position to the closed position. Accordingly, the cable stay ramp assembly 300 prevents damage to and/or improper activation by the one or more sensors 260. The cable stay ramp assembly 300 includes a ramp 302. The cable stay ramp assembly 300 may be attached to or disposed on and protrude from a vehicle side panel 280 of the vehicle body 202. The ramp 302 may comprise an angled surface configured to guide the cable stay 270 such that the cable stay 270 is properly aligned inward toward a tailgate side surface 290 of the tailgate 210 when the tailgate 210 is transitioned from the open position to the closed position. The cable stay ramp assembly 300 may comprise a plastic material or a hard resin or thermoplastic material such as polypropylene (PP) or polyoxymethylene (POM).

Referring now to FIGS. 3A and 3B, a detailed view of the cable stay ramp assembly 300 is shown. The cable stay ramp assembly 300 may include a collar 304 (e.g., a nut, a bolt, a screw, etc.) made of a steel or plastic material. The collar 304 may be configured to secure the ramp 302 in place against the vehicle side panel 280. For instance, once the ramp 302 is positioned as desired, the collar 304 may be configured to attach the ramp 302 to the vehicle side panel 280. The ramp 302 is sloped from narrow to wide where the wider portion is adjacent to a vehicle body surface 282. As the tailgate 210 is moving from the open position to the closed position, the cable 272 first contacts the narrower portion of the ramp 302. As the tailgate 210 continues to close, the cable 272 then contacts the wider portion of the ramp 302, which pushes or moves the cable 272 away from the tailgate touch sensors 260 thus preventing improper contact and false activation of the sensors 260. The sloped ramp 302 directs the cable 272 away from the sensors 260 as the cable 272 moves towards the wider portion of the ramp 302. The cable stay ramp assembly 300 advantageously prevents improper contact and false activation of the sensors 260 by the cable 272. The cable stay ramp assembly 300 adds material and/or a part onto the vehicle side panel 280 to guide the cable stay 270 away from the sensors 260, preventing damage to the touch sensors 260 and degradation of the touch sensor activation. The cable stay ramp assembly 300 is also used to maintain the cable stay 270 away from the sensors 260 when the tailgate 210 is in the closed position. The vehicle body surface 282 may be substantially perpendicular to the vehicle side panel 280.

The cable stay ramp assembly 300 may further include at least one anti-rotation tab 306. The at least one anti-rotation tab 306 may be disposed between the ramp 302 and the vehicle body surface 282. The at least one anti-rotation tab 306 may be configured to prevent the ramp 302 from moving as a force from the cable stay 270 is applied when the tailgate 210 is closed and/or is closing. In various embodiments, the ramp 302 may be coupled to the vehicle side panel 280 and/or the vehicle body surface 282 via bolts, screws, adhesive, or other means to fastening. For example, a screw may be used in the hole to attach the collar 304 to the vehicle side panel 280. In various embodiments, the ramp 302 may be an integral piece to the vehicle body 202.

In various embodiments, as shown in FIG. 2B, the ramp 302 of the cable stay ramp assembly 300 extends along a substantial portion of the vehicle side panel 280. For example, the ramp 302 may be 60 mm L (for-aft direction of the vehicle)×10 mm W (left-right direction of the vehicle)× 100 mm H (up-down direction of the vehicle). The ramp 302 may be configured to extend a maximum length of the vehicle side panel 280 in consideration of the packaging space of the vehicle 100. For instance, in various embodiments, as shown in FIG. 3B, the ramp 302 may only extend along the vehicle side panel 280 a shorter length necessary to contact and guide the cable stay 270 or the cable 272.

Figure 4:
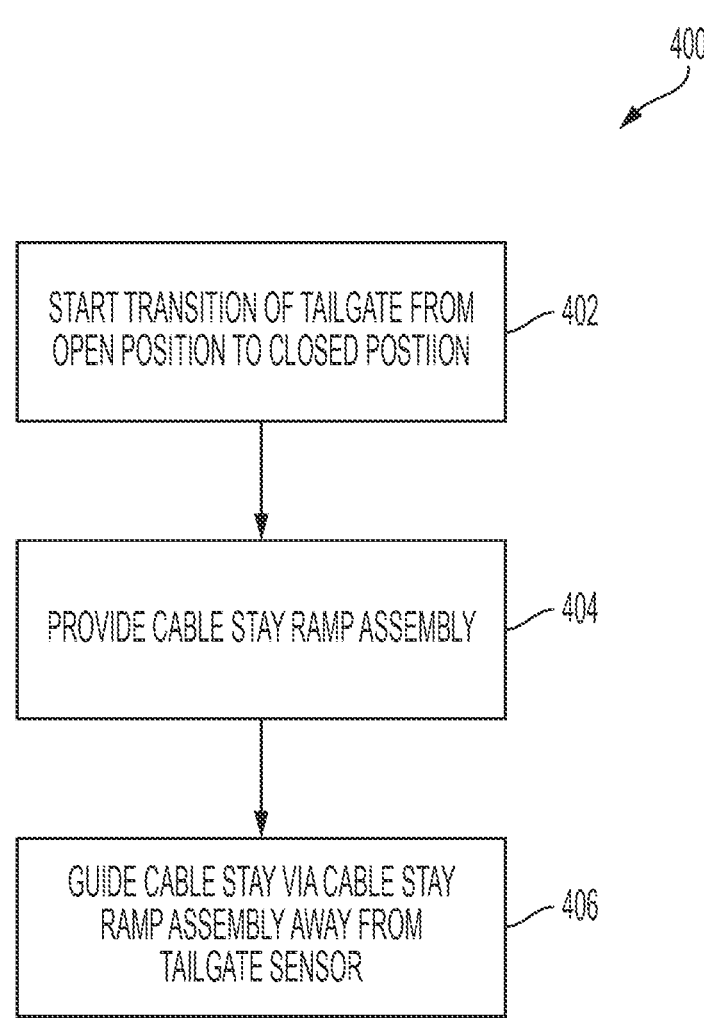
FIG. 4 illustrates a method of using the cable stay ramp assembly of FIGS. 3A and 3B according to an aspect of the present disclosure.

Referring now to FIG. 4, a flow chart of a method 400 of using a cable stay ramp assembly (e.g., cable stay ramp assembly 300) is illustrated. At 402, a tailgate is starting to be transitioned from an open position to a closed position. For instance, a user may start to close the tailgate. A cable stay is coupled to a tailgate and a vehicle body such that the cable stay extends between the tailgate and the vehicle body. The cable stay includes a flexible cable such that the cable stay is bent and folds into itself as the tailgate moves from the open position to the closed position. As the tailgate is closed, the cable stay may be partial to moving outward due to a certain stiffness in the cable. Accordingly, the cable stay may interfere with at least one sensor disposed on the tailgate.

At 404, a cable stay ramp assembly is provided. For instance, the cable stay ramp assembly may be disposed along and extend from a vehicle side panel of the vehicle body. The cable stay ramp assembly may include a ramp protruding from the vehicle side panel. As such, at 406, the cable stay ramp assembly guides and aligns the cable stay inward, thus avoid contact with the at least one sensor. Thus, the cable stay ramp assembly prevents damage to the at least one sensor of a power tailgate system used with the vehicle.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle comprising:
a tailgate configured to enclose a vehicle bed;
a power tailgate system configured to cause the tailgate to move between a closed position and an open position; and
a cable stay coupled to the tailgate and a body of the vehicle such that the cable stay is extended between the tailgate and the body of the vehicle when the tailgate is in the open position; and
a cable stay ramp assembly including a ramp disposed on and protruding from a vehicle side panel of the body of the vehicle, the ramp having an angled surface configured to guide the cable stay such that the cable stay is properly aligned inward toward a tailgate side surface of the tailgate when the tailgate is transitioned from the open position to the closed position.

2. The vehicle of claim 1, wherein the power tailgate system comprises a motor assembly coupled to the tailgate and configured to cause the tailgate to move between the closed position and the open position.

3. The vehicle of claim 2, wherein the motor assembly comprises a spindle drive coupled to a hinge arm, the hinge arm coupled to a hinge mechanism which permits rotary motion of the tailgate between the closed position and the open position.

4. The vehicle of claim 3, wherein the spindle drive is constructed to functionally extend or contract to move the hinge arm which in turn causes the tailgate to pivot on the hinge mechanism between the open position and the closed position.

5. The vehicle of claim 1, further comprising at least one sensor disposed on the tailgate, the sensor configured to detect an object between the tailgate and the body of the vehicle, wherein the at least one sensor is a tailgate touch sensor.

6. The vehicle of claim 5, wherein the tailgate touch sensor comprises a sensing portion configured to be depressed by a reaction force from the object, thereby detecting the object.

7. The vehicle of claim 6, wherein, in response to detecting the object, the tailgate stops moving to the closed position.

8. The vehicle of claim 1, wherein the cable stay comprises a cable, a first fastener, and a second fastener, the cable configured to extend between the first fastener and the second fastener.

9. The vehicle of claim 8, wherein the first fastener is configured to couple the cable to the body of the vehicle body, and the second fastener is configured to couple the cable to the tailgate.

10. The vehicle of claim 1, wherein the cable stay ramp assembly comprises a steel collar configured to secure the ramp in place against the vehicle side panel.

11. The vehicle of claim 1, wherein the cable stay ramp assembly comprises at least one anti-rotation tab configured to be disposed between the ramp and a vehicle body surface.

12. The vehicle of claim 11, wherein the at least one anti-rotation tab is configured to prevent the ramp from moving as a force from the cable stay is applied when the tailgate is moving to the closed position.

13. A cable stay ramp assembly of a vehicle, the cable stay ramp assembly comprising:
a ramp disposed on and protruding from a vehicle side panel of a body of the vehicle and having an angled surface configured to guide a cable stay of a tailgate such that the cable stay is properly aligned inward toward a tailgate side surface of the tailgate when the tailgate is transitioned from an open position to a closed position.

14. The cable stay ramp assembly of claim 13, wherein the cable stay comprises a cable, a first fastener, and a second fastener, the cable configured to extend between the first fastener and the second fastener.

15. The cable stay ramp assembly of claim 14, wherein the first fastener is configured to couple the cable to the body of the vehicle body, and the second fastener is configured to couple the cable to the tailgate.

16. The cable stay ramp assembly of claim 13, further comprising a steel collar configured to secure the ramp in place against the vehicle side panel.

17. The cable stay ramp assembly of claim 16, further comprising at least one anti-rotation tab configured to be disposed between the ramp and a vehicle body surface, wherein the at least one anti-rotation tab is configured to prevent the ramp from moving as a force from the cable stay is applied when the tailgate is moving to the closed position.

18. A method of using a cable stay ramp assembly, the method comprising:
transitioning a tailgate of a vehicle from an open position to a closed position;
providing the cable stay ramp assembly including a ramp disposed on and protruding from a vehicle side panel of the vehicle and having an angled surface; and
guiding a cable stay, via the ramp of the cable stay ramp assembly, such that the cable stay is properly aligned inward toward a tailgate side surface of the tailgate when the tailgate is transitioned from the open position to the closed position and avoids contact with at least one sensor disposed on the tailgate.

* * * * *